Jan. 22, 1929.
O. HERTING
COOKING UTENSIL
Filed Feb. 25, 1928
1,699,844
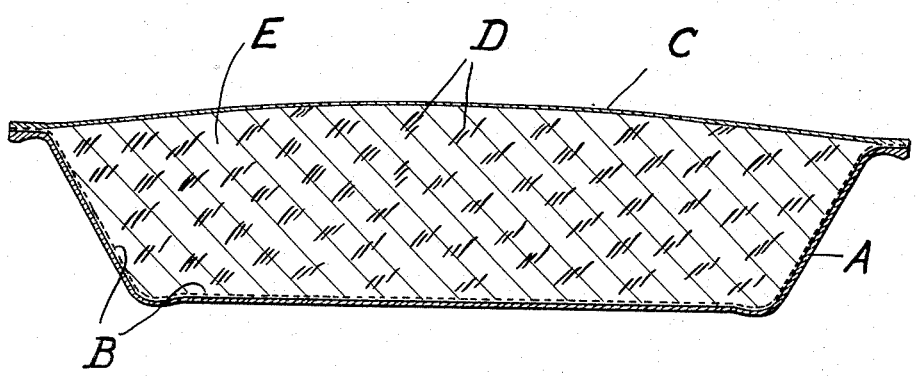
WITNESS:
Rob R Kitchel.
INVENTOR
Otto Herting
BY
Burr & Harding
ATTORNEYS.

Patented Jan. 22, 1929.

1,699,844

UNITED STATES PATENT OFFICE.

OTTO HERTING, OF PHILADELPHIA, PENNSYLVANIA, ASSIGNOR TO SANI PAPER PRODUCTS CO. INC., OF PHILADELPHIA, PENNSYLVANIA, A CORPORATION OF DELAWARE.

COOKING UTENSIL.

Application filed February 25, 1928. Serial No. 256,920.

My invention relates to an improvement in cooking utensils and more particularly to a plate or dish produced from fibrous material and adapted for the baking of pies or the like.

Heretofore plates or dishes for the baking of pies and the like have been produced almost exclusively from metal, glass or earthenware and while such have been found to be substantially satisfactory, there is a demand for a less expensive article and one which will lend itself to use but once and is both a cooking utensil and a container for the finished product, thus avoiding washing, collecting, etc., and which will insure a sanitary condition from the making up of the product until its consumption.

Heretofore a plate or dish formed from fibrous material and efficiently fireproofed has been developed for use in the baking of pies and such forms the subject matter of a certain application for patent filed by Otto Harting, filed January 3, 1927, Serial No. 158,521. Such dish or plate, however, while it is efficient for the baking of pies of the character having both an upper and lower crust, has not been found adaptable for the baking of the so-called open pies, such, for example, as meat pies, in which the filling is placed directly in the plate or dish in which it is to be baked and provided with an upper or top crust only, since such dish or plate will become softened and lose its shape due to the softening effect of the liquid constituent of the filling on the fibrous material of which the dish or plate is formed, with the result that it becomes not only ineffective as a cooking vessel, but it cannot be used as a container for the cooked product.

Now it is the object of my invention to provide a plate or dish produced from absorptive material, as a fibrous material, efficiently fireproofed and so treated as to be unaffected by the liquid ingredients of pies, thus enabling its use for the production of open pies and its continued use as a container for such pies until consumed.

Referring now to the accompanying drawings, in which the single figure is a sectional view of a plate or dish embodying my invention, A indicates the plate or dish which may be formed of any suitable absorptive material, as for example, kraft board. The material of which the plate is formed is impregnated with a suitable fireproofing material preferably water insoluble and of a character such as will render the material resistant to baking temperatures and which will not exude from the material under the heat of baking temperatures. For example, the fibrous material may be impregnated with, for example, aluminum or titanium silicate, or both, or it may be impregnated with a complex silicate as, for example, sodium-aluminum silicate. The impregnation of the material may be effected in any suitable manner, as, for example, by the material disclosed in the application for patent of Otto Harting, filed January 3, 1927, Serial No. 158,521.

B indicates a coating of water resistant material laid on the interior surface of the plate or dish. The interior of the dish may be coated with, for example, paraffine, preferably of a relatively high melting point, or with a mixture of paraffine with carnauba wax in an amount of from 6%–10%, say preferably a mixture containing 94% paraffine, melting point of about 137° F., and carnauba wax 6%. The paraffine, or mixture of paraffine and carnauba wax, rendered fluid as by heating or dissolving in a volatile solvent, may be applied to the plate or dish after its impregnation by brushing, spraying or in any other suitable manner.

C indicates the top crust of, for example, a meat pie, while the solid ingredients, as potatoes, meat, etc., are indicated at D and the fluid ingredients, as gravy, consisting principally of water, is indicated by the lines E.

In producing the plate or dish in accordance with my invention, the plate is first impregnated with the fireproofing ingredient and with the plate in a dry condition the water-resistant coating is applied. When the water resistant coating has hardened, the plate or dish is ready for use.

When the plate or dish is used, the fibrous material is protected from the softening action of the liquid ingredient of, for example, an open meat pie, by the water-resistant coating, which on heating of the plate or dish, as in the baking operation, will penetrate the plate and protect the fibres individually rather than as a coating. The water-resistant coating thus protects the material of the plate during the making up of a pie, during baking and subsequent to baking until the pie is consumed, without entering into or otherwise effecting the pie.

Having now fully described my invention, what I claim and desire to protect by Letters Patent is:

1. A cooking utensil formed from a normally inflammable absorptive material rendered resistant to heat at baking temperatures by impregnation with a fireproofing substance which will not exude at baking temperatures and coated on its inner surface with a water resistant material which will penetrate the body of the utensil at baking temperatures.

2. A cooking utensil formed from a normally inflammable absorptive material rendered resistant to heat at baking temperatures by impregnation with a fireproofing substance which will not exude at baking temperatures and coated on its inner surface with paraffine of relatively high melting point.

3. A cooking utensil formed from a normally inflammable absorptive material rendered resistant to heat at baking temperatures by impregnation with a fireproofing substance which will not exude at baking temperatures and coated on its inner surface with a mixture of paraffine and carnauba wax.

4. A cooking utensil formed from a normally inflammable absorptive material rendered resistant to heat at baking temperatures by impregnation with a fireproofing substance which will not exude at baking temperatures and coated on its inner surface with a composition comprising paraffine of relatively high melting point and carnauba wax in amount from about 6% to about 10%.

In testimony of which invention, I have hereunto set my hand, at Philadelphia, Pennsylvania, on this 20th day of January, 1928.

OTTO HERTING.